United States Patent

Gellert

[11] Patent Number: 6,077,067
[45] Date of Patent: Jun. 20, 2000

[54] INJECTION MOLDING APPARATUS HAVING A COOLING CORE WITH A RIBBED CAP

[76] Inventor: Jobst Ulrich Gellert, 7A Prince Street, Georgetown, Ontario, Canada, L7G 2X1

[21] Appl. No.: 09/218,640

[22] Filed: Dec. 22, 1998

[30] Foreign Application Priority Data

Dec. 7, 1998 [CA] Canada ................................ 2255800

[51] Int. Cl.[7] ................................................. B29C 45/73
[52] U.S. Cl. .................................... 425/552; 264/328.16
[58] Field of Search ........................... 425/526, 547, 425/552, 548, 549; 264/328.16

[56] References Cited

U.S. PATENT DOCUMENTS

| 4,634,366 | 1/1987 | Brun et al. .............................. 425/547 |
| 5,094,603 | 3/1992 | Gellert . |
| 5,498,150 | 3/1996 | Check . |
| 5,582,788 | 12/1996 | Collette et al. ........................ 425/547 |

OTHER PUBLICATIONS

Mold–Masters Brochure entitled "Introducing Master–Stack Closure Molding Components"—No Date.

*Primary Examiner*—Tim Heitbrink
*Attorney, Agent, or Firm*—Dalesman & Company

[57] ABSTRACT

Injection molding apparatus with each elongated cooled mold core (10) having a number of cooling fluid bores (118) or grooves (134) extending around a central cooling fluid duct (104). An integral dome shaped front cap (76) encloses the open front end (78). The inner surface (130) of the dome shaped cap (76) has curved ribs (132) which form curved cooling fluid grooves (134) aligned with the cooling fluid bores (118) or grooves (134). The curved ribs (132) give the dome shaped front cap (76) more strength which allows it to be thinner with the curved cooling fluid grooves (134) being closer to the cavity (66) to improve cooling efficiency.

5 Claims, 3 Drawing Sheets

INJECTION MOLDING APPARATUS HAVING A COOLING CORE WITH A RIBBED CAP

BACKGROUND OF THE INVENTION

This invention relates generally to hot runner injection molding and more particularly to injection molding apparatus having an improved mold core.

Cooling the mold cores of hot runner injection molding systems to reduce cycle time is well known. Reducing cycle time by even a fraction of a second is very important in large volume applications such as making beverage bottle preforms. As seen in U.S. Pat. No. 5,094,603 to the applicant which issued Mar. 10, 1992, this has normally been done by circulating water or other suitable cooling fluid such as glycol through and around a central cooling tube or pipe in the mold core. While this arrangement is satisfactory from some applications, it would be preferable for many applications if greater cooling efficiency could be achieved.

U.S. Pat. No. 5,498,150 to Check which issued Mar. 12, 1996 does show a mold core having a pipe extending in an outer part with a hemispherical shaped surface at the front end and longitudinally extending grooves therein. While the grooves do increase the cooling surface area, there is still too much delay waiting for the melt to solidify before the mold can be opened for ejection. Furthermore, if the front end of the mold core which forms a part of the cavity is made as thin as possible to achieve greater cooling, it may not have sufficient structural strength to withstand injection pressures of up to 10,000 psi.

Mold-Masters brochure entitled "Introducing Master-Stack Closure Molding Components" shows a mold core having a head with cooling fluid bores extending radially outward therein. While this suitable for molding closures, it is not for molding preforms.

SUMMARY OF THE INVENTION

Accordingly, it is an object of the present invention to at least partially overcome the disadvantages of the prior art by providing an integral mold core having a number of cooling fluid bores or grooves and a ribbed front cap with grooves directing cooling fluid flow to the bores or grooves providing a greater combination of structural strength and cooling efficiency.

To this end, in one of its aspects, the invention provides injection molding apparatus having an elongated cavity in a mold and a cooled mold core. The mold core is made of a hollow elongated body and a front cap having an inner surface and an outer surface. The elongated body has an open front end, an outer surface and a longitudinally extending central duct to convey cooling fluid therethrough. The outer surface of the front portion of the outer part and the outer surface of the front cap form an inner side of the mold cavity. The front cap is dome shaped and the elongated body has a plurality of cooling fluid bores extending longitudinally around the central duct. The elongated body and the front cap are integrally joined together whereby the front cap encloses the open front end of the elongated body to form a cooling fluid conveying space extending between the central duct and the cooling fluid bores. The inner surface of the front cap has a number of curved ribs extending into the cooling fluid conveying space to form a number of curved grooves between them. Each of the curved grooves is aligned with one of the cooling fluid bores in the elongated body.

In another of its aspects, the invention provides injection molding apparatus having an elongated cavity in a mold and a cooled mold core. The mold core is made of a hollow elongated inner part, a hollow elongated outer part, and a front cap having an inner surface and an outer surface. The elongated inner part has a front portion with an open front end, an outer surface and a longitudinally extending central duct to convey cooling fluid therethrough. The elongated outer part has a front portion with an open front end, an outer surface, and an inner surface which fits around the outer surface of the front portion of the inner part. One or more of the inner surface of the front portion of the elongated outer part and the outer surface of the front portion of the elongated inner part have a number of cooling fluid conveying grooves extending longitudinally therein. The outer surface of the front portion of the outer part and the outer surface of the front cap form an inner side of the mold cavity. The front portion of the elongated inner part, the front portion of the elongated outer part and the front cap are integrally joined together whereby the front cap encloses the open front end of the front portion of the outer part to form a cooling fluid conveying space extending between the central duct in the front portion of the inner part and the cooling fluid conveying grooves. The inner surface of the front cap has a number of curved ribs which form a number of curved grooves between them. The curved grooves are aligned with the grooves in one or more of the inner surface of the front portion of the outer part and the outer surface of the front portion of the inner part of the mold core.

Further objects and advantages of the invention will appear from the following description taken together with the accompanying drawings.

DETAILED DESCRIPTION OF THE INVENTION

Figure 1:
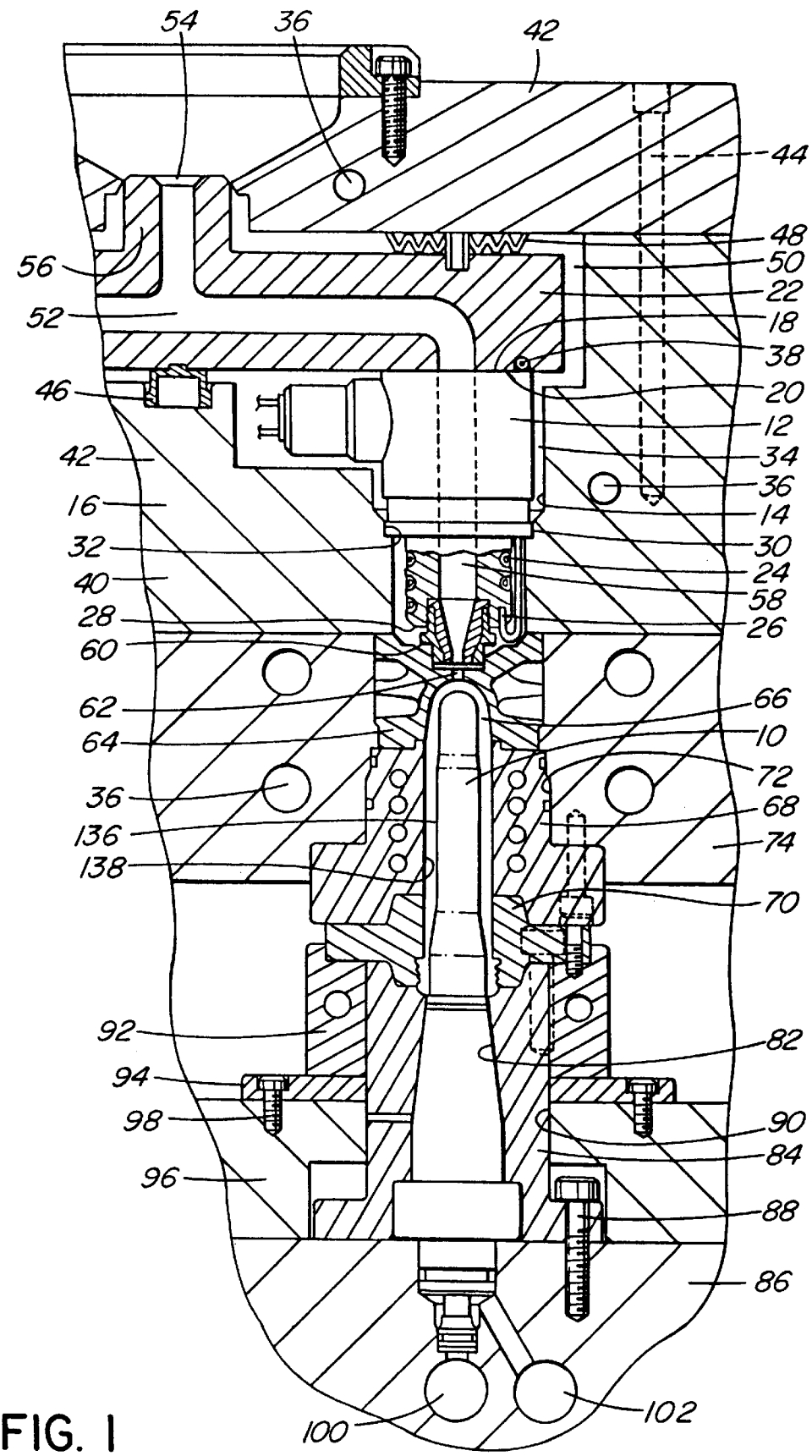
FIG. 1 is a sectional view showing a portion of a multi-cavity injection molding system having a cooled mold core with a front cap according to one embodiment of the invention.
Figure 2:
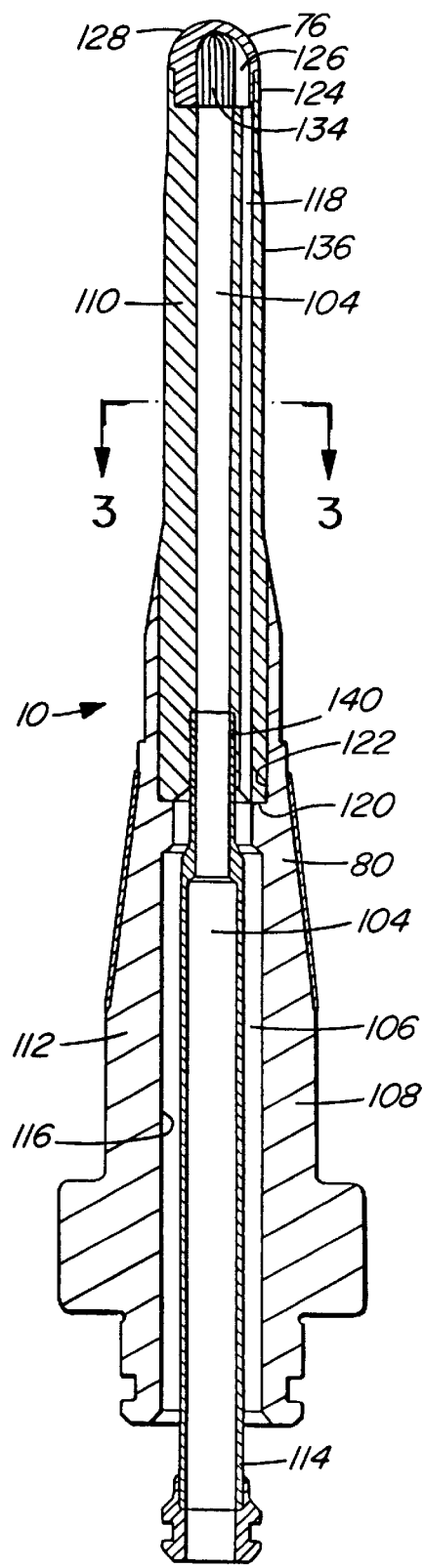
FIG. 2 is a sectional view of the mold core seen in FIG. 1.
Figure 3:
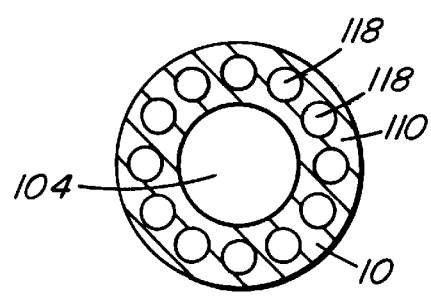
FIG. 3 is a cross-sectional view taken along line 3—3 in FIG. 2.

Reference is first made to FIGS. 1–4 which show a portion of a multi-cavity injection molding system or apparatus used for molding beverage bottle preforms having a cooled mold core 10 according to one embodiment of the invention. In this configuration, a number of heated nozzles 12 are mounted in openings 14 in a mold 16 with the rear end 18 of each heated nozzle 12 abutting against the front face 20 of a steel melt distribution manifold 22. Each nozzle 12 is heated by an integral electrical heating element 24 and has a thermocouple element 26 extending into its front end 28 to monitor and control the operating temperature. Each heated nozzle 12 has a cylindrical locating flange 30 seated in a circular locating seat 32 in the opening 14. This provides an insulative air space 34 between the heated nozzle 12 and the surrounding mold 16, which is cooled by pumping cooling water through cooling conduits 36.

The melt distribution manifold 22 is also heated by an integral electrical heating element 38. The melt distribution manifold 22 is mounted between a manifold plate 40 and a clamp plate 42 which are secured together by bolts 44. The melt distribution manifold 22 is located by a central locating ring 46 and a number of resilient spacers 48 which provide an insulative air space 50 between it and the surrounding cooled mold 16.

A melt passage 52 extends from a central inlet 54 in an inlet portion 56 of the melt distribution manifold 22 and branches in the melt distribution manifold 22 to extend through a central melt bore 58 in each of the heated nozzles 12. The melt passage 52 extends through a two-piece nozzle seal 60 aligned with a gate 62 extending through a cooled gate insert 64 to a cavity 66. This cavity 66 for making beverage bottle preforms extends between a cavity insert 68 and thread split inserts 70 on the outside and the cooled mold core 10 according to the invention on the inside. The gate insert 64 and the cavity insert 68 are seated in an opening 72 in a cavity plate 74 through which cooling water lines (not shown) extend to the cooled gate insert 64.

As can be seen, the cooled mold core 10 according to this embodiment of the invention has a steel dome shaped front cap 76 which fits over the open front end 78 of a hollow elongated steel body 80. The mold core 10 extends rearwardly from the cavity 66 through an opening 82 in a core lock member 84 which is secured to a core backing plate 86 by screws 88. The core lock member 84 extends through an opening 90 in a slide member 92 and a wear plate 94 which is secured to a stripper plate 96 by screws 98. Cooling fluid supply and return lines 100, 102 extend in the core backing plate 86 and are connected respectively to a central duct 104 extending longitudinally through the body 80 and an outer cooling fluid duct 106 extending through a rear portion 108 of the elongated body 80 as described below. Of course, in other applications, the mold 16 can have different numbers and shapes of parts and plates depending upon the configuration required.

The elongated body 80 of the cooled mold core 10 has a front portion 110 extending from the rear portion 108. The rear portion 108 has a hollow outer part 112 and a hollow inner part 114 through which the central duct 104 extends. The hollow outer part 112 has a central opening 116 therethrough in which the inner part 114 is received to form the outer cooling fluid duct 106 extending between the outer and inner parts 112, 114 of the rear portion 108.

The front portion 110 of the elongated body 80 has a number of gun drilled cooling fluid bores 118 extending longitudinally therethrough. The cooling fluid bores 118 extend in a circle around the central duct 104. The cooling fluid bores 118 extending through the front portion 110 connect the front end 78 of the body 80 to the outer cooling fluid duct 106 extending through the rear portion 108. As can be seen, in this embodiment the rear end 120 of the front portion 110 is received in a seat 122 in the rear portion 108 with the central duct 104 extending in alignment through both the rear and front portions 108, 110.

Figure 4:
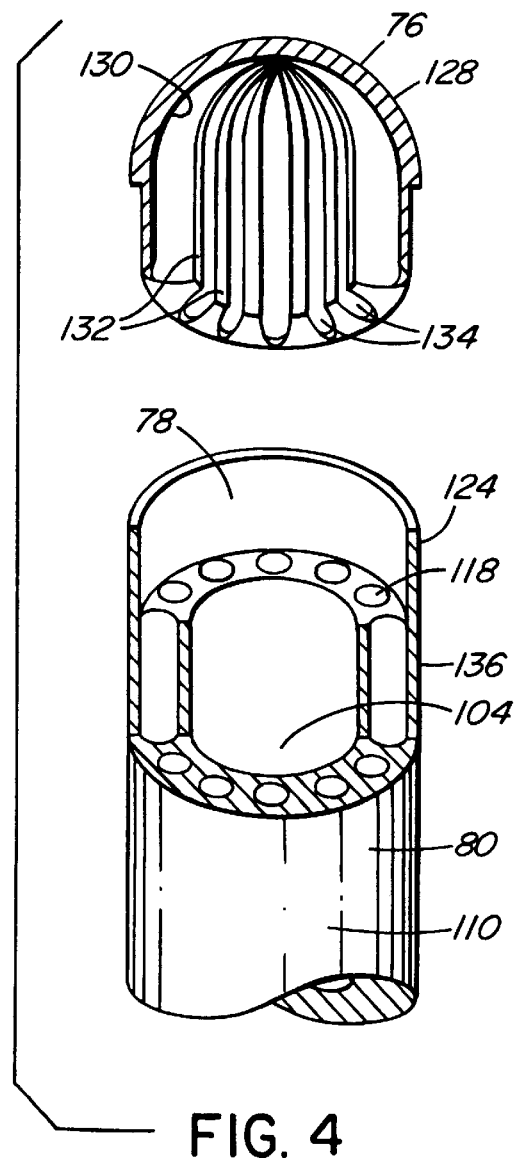
FIG. 4 is an isometric view of part of a body and a front cap in position for assembly to form the mold core seen in FIG. 2.

As best seen in FIG. 4, the front end 78 of the body 80 has a cylindrical flange 124 extending frontwardly from around the cooling fluid bores 118, into which the front cap 76 is received according to the invention. The dome shaped front cap 76 encloses the open front end 78 of the elongated body 80 and provides a cooling fluid conveying space 126 to convey cooling fluid from the central duct 104 to the bores 118 in the body 80. The dome shaped front cap 76 has an outer surface 128 and an inner surface 130 with a number of curved ribs 132 which form curved grooves 134 between them. The outer surface 136 of the elongated body 80 and the outer surface 128 of the dome shaped front cap 76 form an inner side 138 of the cavity 66. The curved grooves 134 in the inner surface 130 of the front cap 76 are aligned with the bores 118 in the front portion 108 of the elongated body 80 to channel the cooling fluid from the central duct 104 in the elongated body 80 into the bores 118. This gives the front cap 76 more structural strength which, in turn, allows it to be thinner which improves cooling efficiency.

The rear and front portions 108, 110 of the elongated body 80 and the dome shaped front cap 76 are assembled and integrally joined together by a suitable process such as brazing in a vacuum furnace or by hot isostatic pressing. In this embodiment, the inner part 114 of the rear portion 108 called a bubbler tube is press fitted into place with a sleeve portion 140 which fits inside the front portion 110 of the elongated body 80. Integrally joining the rear and front portions 108, 110 and the dome shaped front cap 76 together provides the cooled mold core 10 with more strength which allows the curved grooves 134 in the front cap 76 and the bores 118 in the front portion 110 to be closer to the cavity 66 to improve cooling efficiency. It also ensures that the central cooling fluid duct 104 is precisely located in the center of the cooled mold core 10.

In use, after the system has been assembled as shown in FIG. 1, electrical power is applied to the heating elements 24, 38 to heat the nozzles 12 and the melt distribution manifold 22 to a predetermined operating temperature. A suitable cooling fluid such as water is also circulated by pumps (not shown) through the cooling conduits 36 in the mold 16 and the lines leading to the cavity inserts 68. Usually a cleaner cooling fluid such as glycol is pumped in a closed loop cooling system through the supply and return lines 100, 102 to circulate through the mold cores 10. Pressurized melt from a molding machine (not shown) is then introduced according to a predetermined injection cycle into the central inlet 54 of the melt passage 52 of the melt distribution manifold 22, from where it flows through the central melt bore 58 in each of the heated nozzles 12 and the two-piece nozzle seals 60 and through the gates 62 to fill the cavities 66. After the cavities 66 are full, injection pressure is held momentarily to pack and then released. After a short cooling period, the mold 16 is opened to eject the product. After ejection, the mold 16 is closed and the injection pressure is reapplied to refill the cavity 66. This cycle is repeated continuously with a cycle time that has been reduced as a result of improved cooling from the mold core 10.

Figure 5:
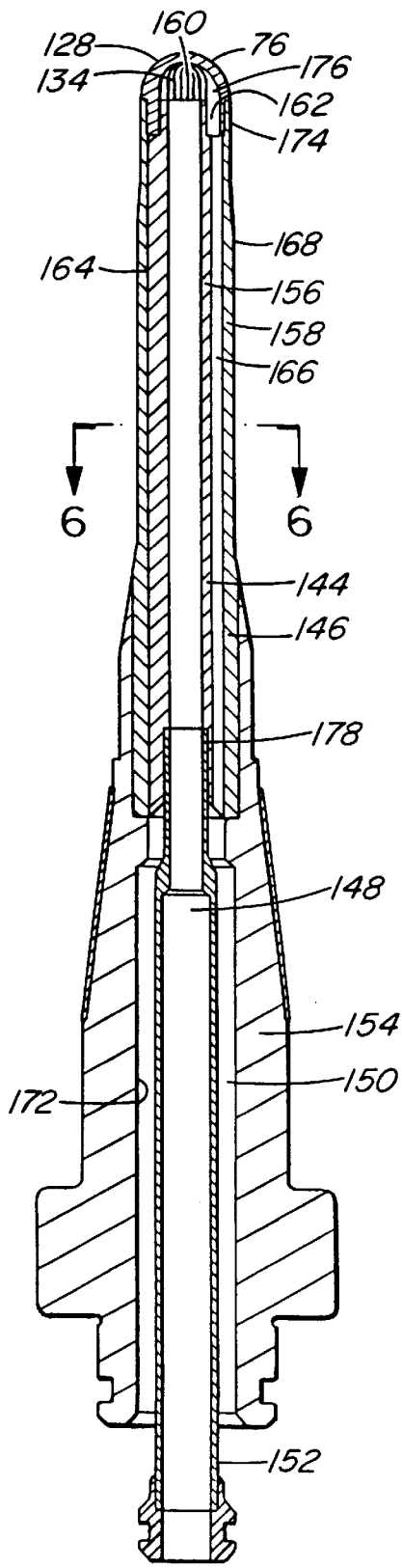
FIG. 5 is a sectional view of a mold core according to another embodiment of the invention.
Figure 6:
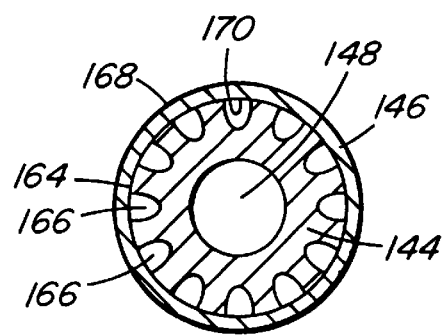
FIG. 6 is a cross-sectional view taken along line 6—6 in FIG. 5.

Reference is now made to FIGS. 5 and 6 as well as FIG. 1 to describe a cooled mold core 10 according to another embodiment of the invention. As the dome shaped front cap 76 and some other elements are the same as described above, elements common to both embodiments are described and illustrated using the same reference numbers. In this embodiment, the cooled mold core 10 has a hollow elongated inner part 144 which fits inside a hollow elongated outer part 146. The cooling fluid supply and return lines 100, 102 extending in the core backing plate 86 are connected respectively to a longitudinally extending central duct 148 in the inner part 144 and an outer cooling fluid duct 150 extending between a rear portion 152 of the inner part 144 and a rear portion 154 of the outer part 146. The inner part 144 and the outer part 146 have front portions 156, 158 with open front ends 160, 162. The front portion 156 of the inner part 144 with the central cooling fluid duct 148 extending therethrough has an outer surface 164 with longitudinally extending grooves 166 therein. The front portion 158 of the outer part 146 has an outer surface 168 and a cylindrical inner surface 170 which fits around the outer surface 164 of the front portion 156 of the inner part 144. While the grooves 166 extending parallel to each other are shown in the outer surface 164 of the front portion 156 of the inner part 144, in other embodiments the grooves can be in the inner surface 170 of the front portion 158 of the outer part 146, or in both the outer and inner surfaces 164, 170. The rear portion 154 of the outer part 146 has a central opening 172 therethrough in which the rear portion 152 of the inner part 144 is received to form the outer cooling fluid duct 150 extending between the rear portion 152 of the inner part 144 and the rear portion 154 of the outer part 146.

The front end 162 of the outer part 146 has a forwardly extending cylindrical flange 174 into which the dome shaped front cap 76 is received. The dome shaped front cap 76 which is the same as described above encloses the open front end 162 of the outer part 112 and provides a cooling fluid conveying space 176 to convey cooling fluid from the central duct 148 in the inner part 144 to the grooves 166 in the outer surface 164 of the front portion 156 of the inner part 144. As described above, the dome shaped front cap 76 has an outer surface 128 and inner surface 130 with a number of curved ribs 132 which form curved grooves 134 between them. The outer surface 168 of the front portion 158 of the outer part 146 and the outer surface 128 of the front cap 76 form the inner side 138 of the cavity 66. In this embodiment, the curved grooves 134 in the inner surface 130 of the front cap 76 are aligned with the grooves 166 in the outer surface 164 of the front portion 156 of the inner part 144 to channel the cooling fluid from the central duct 148 in the inner part 144 into the grooves 166 in the outer surface 164 of the front portion 156 of the inner part 144.

The front portion 156 of the inner part 144, the front and rear portions 158, 154 of the outer part 146, and the dome shaped front cap 76 are assembled and integrally joined together by a suitable process such as brazing in a vacuum furnace or by hot isostatic pressing. In this embodiment, the rear portion 152 of the inner part 144 called a bubbler tube is press fitted into place with a sleeve portion 178 which fits inside the front portion 156 of the inner part 144. As with the first embodiment, integrally joining the front portion 156 of the inner part 144, the front and rear portions 158, 154 of the outer part 146 and the dome shaped front cap 76 together provides the cooled mold core 10 with more strength which allows the curved grooves 134 in the front cap 76 and the grooves 166 in the outer surface 164 of the front portion 156 of the inner part 144 to be closer to the cavity 66. The use of this embodiment of the invention is the same as described above for the first embodiment.

Figure 7:
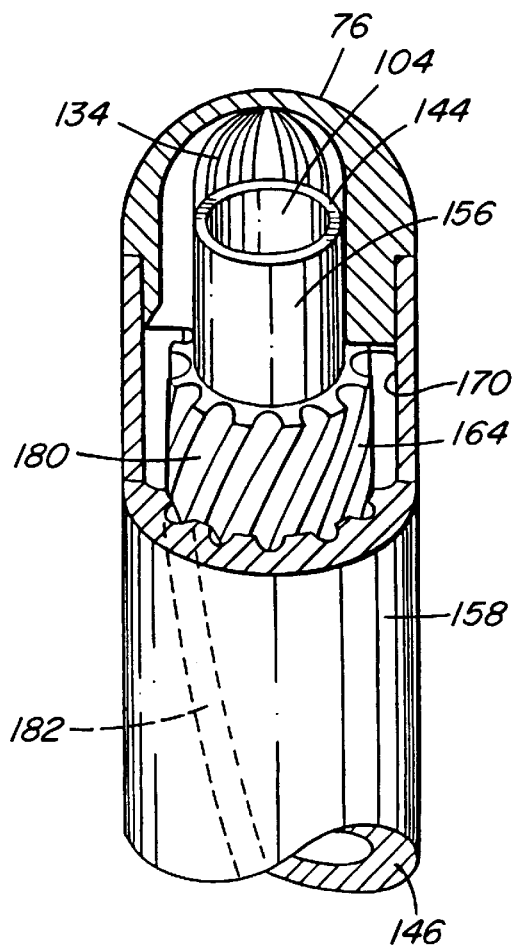
FIG. 7 is a cut-away isometric view of part of a mold core according to a further embodiment of the invention.

Reference is now made to FIG. 7 to describe a cooled mold core 10 according to a further embodiment of the invention. The elements are the same as described above except that both the outer surface 164 of the front portion 156 of the inner part 144 and the inner surface 170 of the front portion 158 of the outer part 146 have spiral grooves 180, 182 extending therearound in opposite directions. The grooves 180, 182 spiralling in opposite directions forces the cooling fluid to flow both back and forth and in and out through the joined grooves 180, 182 resulting in very turbulent flow and more efficient cooling of the melt in the cavity 66.

While the description of the cooled mold core 10 having a ribbed cap and cooling fluid bores or grooves has been given with respect to several embodiments, it will be evident that various other modifications are possible without departing from the scope of the invention as understood by those skilled in the art and as provided in the following claims.

The embodiments of the invention in which an exclusive property or privilege is claimed is defined as follows:

1. In an injection molding apparatus having an elongated cavity (66) in a mold (16) and a cooled mold core (10) made of a hollow elongated body (80) and a front cap (76) having an inner surface (130) and an outer surface (128), the elongated body (80) having an open front end (78), an outer surface (128) and a longitudinally extending central duct (104) to convey cooling fluid therethrough, whereby the outer surface (128) of the body (80) and the outer surface (128) of the front cap (76) form an inner side of the cavity (66), the improvement wherein;

the front cap (76) is dome shaped and the elongated body (80) has a plurality of cooling fluid bores (118) extending longitudinally around the central duct (104), the elongated body (80) and the front cap (76) are integrally joined together whereby the front cap (76) encloses the open front end (78) of the elongated body (80) to form a cooling fluid conveying space (126) extending between the central duct (104) and the cooling fluid bores (118), and the inner surface (130) of the front cap (76) has a plurality of curved ribs (132) extending into said cooling fluid conveying space (126) to form a plurality of curved grooves (134) therebetween, each of the curved grooves (134) being aligned with one of the cooling fluid bores (118) in the elongated body (80).

2. Injection molding apparatus as claimed in claim 1 wherein the elongated body (80) has a rear portion (108) and a front portion (110) with the plurality of cooling fluid bores (118) extending therethrough around the central duct (104), the rear portion (108) having an inner part (114) through which the central duct (104) extends and an outer part (112) with a central opening (116) therethrough in which the inner part (114) of the rear portion (108) is received to form an outer cooling fluid duct (106) extending around the inner part (114) of the rear portion (108) rearwardly from the cooling fluid bores (118) in the front portion (110), and the central duct (104) and the outer cooling duct (106) are connected to cooling fluid conduits (100, 102) to provide a continual flow of cooling fluid through the mold core (10).

3. In an injection molding apparatus having an elongated cavity (66) in a mold (16) and a cooled mold core (10) made of a hollow elongated inner part (144), a hollow elongated outer part (146), and a front cap (76) having an inner surface (130) and an outer surface (128), the elongated inner part (144) having a front portion (156) with an open front end (160), an outer surface (164) and a longitudinally extending central duct (148) to convey cooling fluid therethrough, the elongated outer part (146) having a front portion (158) with an open front end (162), an outer surface (168), and an inner surface (170) which fits around the outer surface (164) of the front portion (156) of the inner part (144), at least one of the inner surface (170) of the front portion (158) of the elongated outer part (146) and the outer surface (164) of the front portion (156) of the elongated inner part (144) having a plurality of cooling fluid conveying grooves (166) extending longitudinally therein, whereby the outer surface (168) of the front portion (158) of the outer part (146) and the outer surface (128) of the front cap (76) form an inner side (138) of the mold cavity (66), the improvement wherein;

the front portion (156) of the elongated inner part (144), the front portion (158) of the elongated outer part (146)

and the front cap (76) are integrally joined together whereby the front cap (76) encloses the open front end (162) of the front portion (158) of the outer part (146) to form a cooling fluid conveying space (176) extending between the central duct (148) in the inner part (144) and the cooling fluid conveying grooves (166) and the inner surface (130) of the front cap (76) has a plurality of curved ribs (132) which form a plurality of curved grooves (134) therebetween, the curved grooves (134) being aligned with said grooves (166) in at least one of the inner surface (170) of the front portion (158) of the outer part (146) and the outer surface (164) of the front portion (156) of the inner part (144) of the mold core (10).

4. Injection molding apparatus as claimed in claim 1 wherein the elongated inner part (144) of the cooled mold core (10) has a rear portion (152) through which the central duct (148) extends, the elongated outer part (146) of the cooled mold core (10) has a rear portion (154) with a central opening (172) therethrough in which the rear portion (152) of the inner part (144) is received to form an outer cooling fluid duct (150) extending around the rear portion (152) of the inner part (144) rearwardly from the longitudinal grooves (166), and the central duct (148) through the inner part (144) and the outer cooling fluid duct (150) extending around the rear portion (152) of the inner part (144) are connected to cooling fluid conduits (100, 102) to provide a continual flow of cooling fluid through the mold core (10).

5. Injection molding apparatus as claimed in claim 4 wherein both the outer surface (164) of the front portion (156) of the inner part (144) and the inner surface (170) of the front portion (158) of the outer part (146) have a plurality of cooling fluid conveying grooves (180, 182) therein, the grooves (180) in the outer surface (164) of the front portion (156) of the inner part (144) and the grooves (182) in the inner surface (170) of the front portion (158) of the outer part (146) spiralling in opposite directions to produce turbulent cooling fluid flow through said grooves (180, 182).

* * * * *